United States Patent [19]

Hartley

[11] Patent Number: 4,742,855

[45] Date of Patent: May 10, 1988

[54] WOODWORKING ROUTER

[75] Inventor: William R. Hartley, Colne, United Kingdom

[73] Assignee: Wadkin plc, Leicester, England

[21] Appl. No.: 42,730

[22] Filed: Apr. 27, 1987

[30] Foreign Application Priority Data

May 27, 1986 [GB] United Kingdom ............... 8612789

[51] Int. Cl.$^4$ ..................... B27G 71/00; B23C 5/02
[52] U.S. Cl. ........................... 144/252 R; 409/137; 144/134 D
[58] Field of Search ............ 74/600; 409/134, 137 R; 144/134 D, 136 C, 251, 252 R

[56] References Cited

U.S. PATENT DOCUMENTS

| | | | |
|---|---|---|---|
| 3,786,846 | 1/1974 | Mehring | 144/252 R |
| 3,837,383 | 9/1974 | Ko | 144/252 R |
| 3,880,047 | 4/1975 | Dosier | 144/252 R |
| 4,051,880 | 10/1977 | Hestily | 144/252 R |
| 4,200,417 | 4/1980 | Hager et al. | 144/252 R |
| 4,244,669 | 1/1981 | Puritz et al. | 409/137 |
| 4,397,342 | 8/1983 | North | 144/252 R |

Primary Examiner—W. Donald Bray
Attorney, Agent, or Firm—Kalish & Gilster

[57] ABSTRACT

A woodworking router has an electric motor driven router head (12) surrounded by a dust collection collar (20). Pneumatic means (26) control the height of the collar relative to the router head between (a) a raised position exposing the router head for tool changing; (b) a lowered safety position in which the collar provides a safety guard around the router head; and (c) an even lower scavenge position for cleaning the worktable without routing. A factory dust collection duct is connected to a dust extraction duct mounting the collar for establishing an air flow over the electric motor (10) for motor cooling.

10 Claims, 5 Drawing Sheets

WOODWORKING ROUTER

The invention relates to woodworking router machines, and particularly to such machines with automatic collection of the dust and debris created during routing, and transfer of that dust and debris to factory dust extraction equipment.

GB No. 2117510 describes a router comprising an electric motor covered with an air suction chamber and mounted for vertical movement. Air suction cools the motor and removes the chips produced. The motor and the suction chamber are integral with on attachment which is vertically movable in operation. Fine adjustment of the position of the motor and chamber in relation to the attachment is provided by a worm shaft and gear, but the position of the motor in relation to the chamber cannot be varied.

The use of such air cooling arrangements on other kinds of machinery is described in EP No. 27958, GB No. 1561581, GB No. 674748, DE No. 2261297 and DE No. 846215, for example.

According to the invention, means are provided for moving the dust collection collar vertically relative to the router head between a raised position in which the router head is exposed for tool changing and a lowered safety position in which the collar provides a safety guard around the router head.

The dust extraction duct in the router of the invention is coaxial with and surrounds the electric motor, which provides a variety of distinct advantages. The means for moving the dust collection collar can move the collar over as large a range of movement as is desired without the collar fouling the motor and router head. Typically the moving means is a fluid-operated means such as a pneumatic ram, and is interlinked with the control circuit to maintain the collar in its lowered safety position while the motor is running. That safety position may be a defined height relative to the worktable so that a brush around the dust collection collar brushes against the table in use, or may be a defined height relative to the router head, always to shroud the router head for enhanced safety. The stroke of the pneumatic ram provides the sole design restriction on the vertical movement of the collar, so that the raised position may be any height necessary to permit easy tool changing.

Another extremely significant and unexpected advantage is the efficiency of the dust extraction air stream to cool the motor. It has been found that the electric motor in the router of the invention is so efficiently cooled by the extraction air that it can be designed as a fanless motor, with the sole cooling means being the flow of dust extraction air through the dust extraction duct. Indeed the running temperature of such a motor can be reduced by up to 30% as compared with a conventional fan-cooled motor, and there is also a significant noise reduction.

The motor cooling by dust extraction air is so efficient that it permits the motor chosen to be one braked by DC injection braking. This is a rapid form of braking normally associated with high heat generation and high running temperatures, but a router of the invention has been successfully tested through a prolonged repeat cycle of 30 seconds running; rapid DC injection braking (over 4 seconds); a short pause; and then rapid acceleration to running speed. Running temperatures were remarkably low, possibly due in part to the fact that the flow of cooling air from the factory dust collection equipment did not stop with the motor but continued throughout the cycle.

A router according to the invention would have a conventional temperature-responsive cut-out device to stop the motor in the case of overheating, such as if the air supply were to fail.

Preferably there are three positions of the dust collection collar relative to the router head: the raised position for tool changing; the lowered safety position for establishing a safety guard around the router head during routing; and an even lower scavenge position for cleaning the bench. In this latter position the dust collection collar completely covers the cutter at the end of the cutting cycle, for example when the operator is removing the workpiece from the worktable or loading a new workpiece. The raised position of the collar is established when the router head is itself raised out of line with the workpiece, and preferably only when to motor has stopped.

The lowered safety position may be adjustable to suit individual tool heads, but once adjusted the collar always returns to the same safety position on actuation of its fluid-operated control means. The even lower position of the collar relative to the router head is an important preferred feature, establishing a very high degree of protection to the operator when the router head is raised. It also enables the router head to be raised to an inoperative position and the dust collection collar lowered into brushing contact with the worktable, so that a preprogrammed sweeping and cleaning of the table can be performed at regular intervals during routing—for example on completion of each article being worked.

The router of the invention is significantly quieter and cooler than those previously known, and consequently more efficient. It permits manual or automatic tool change, and is safer than known routers insofar as the dust collection collar establishes an effective safety guard around the router head in use. The bristle length of a brush head depending from the collar may be short, as the working height of both the router head and the collar may be under microprocessor control to bring even short brush bristles into brushing contact with the workpiece or worktable in use.

DRAWINGS

Figure 1:
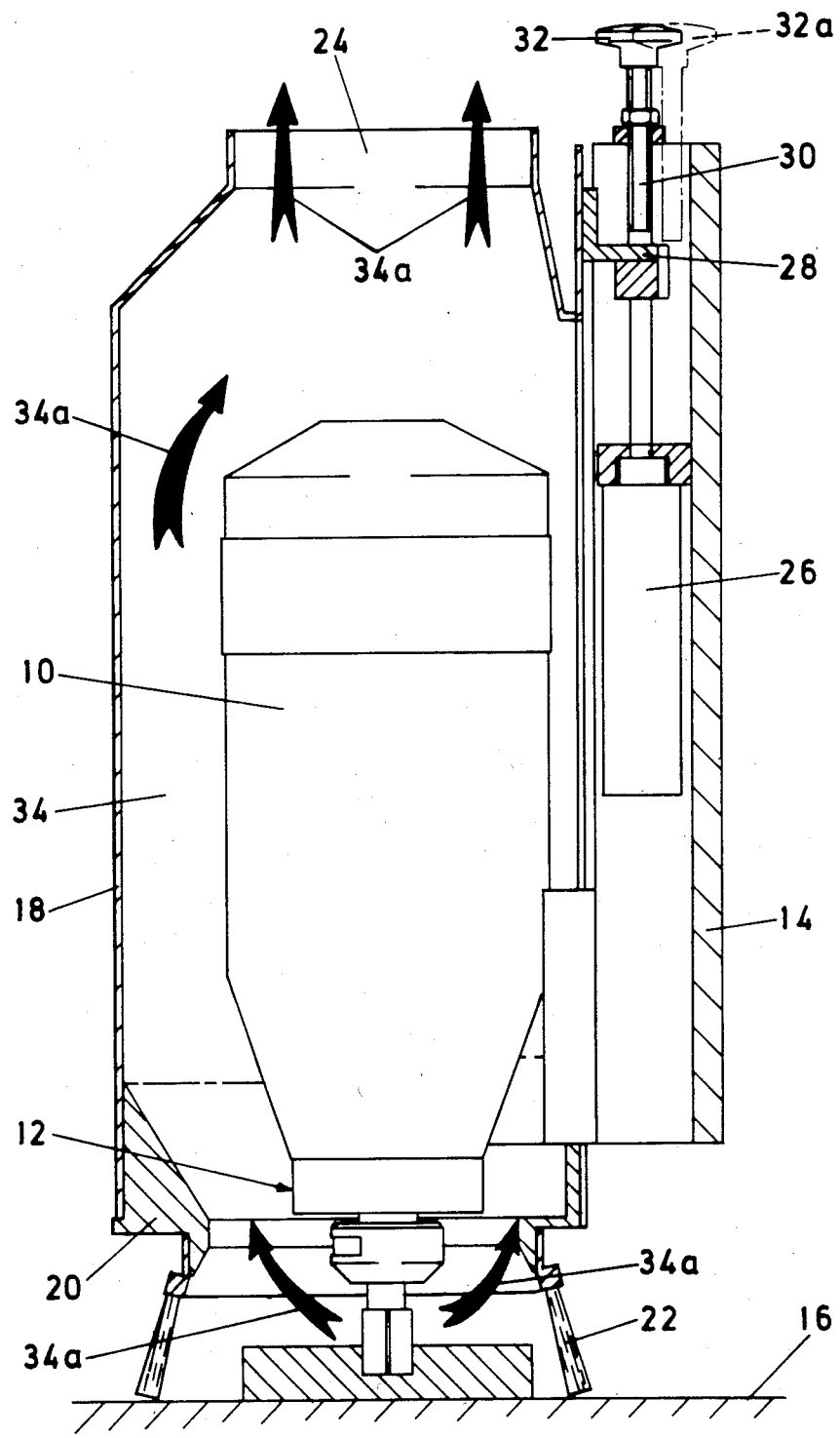
FIG. 1 is an axial section through the working head of a router according to the invention, with the dust collection collar in its lowered safety position during routing.

In the drawings there is shown a woodworking router in which an electric motor 10 drives an integral router head 12. A router tool is shown fitted to the router head in FIGS. 1 and 3, but has been removed in FIG. 2.

Figure 3:
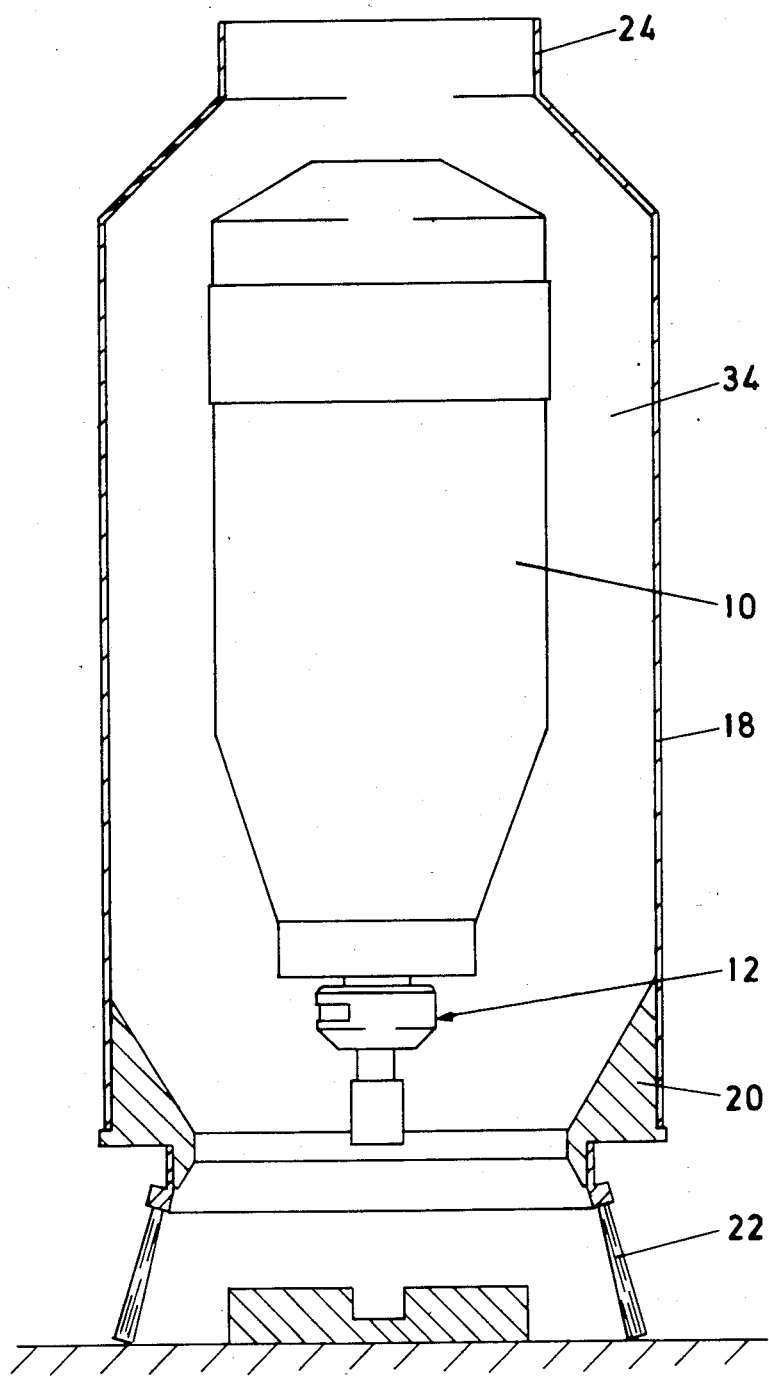
Figure 4:
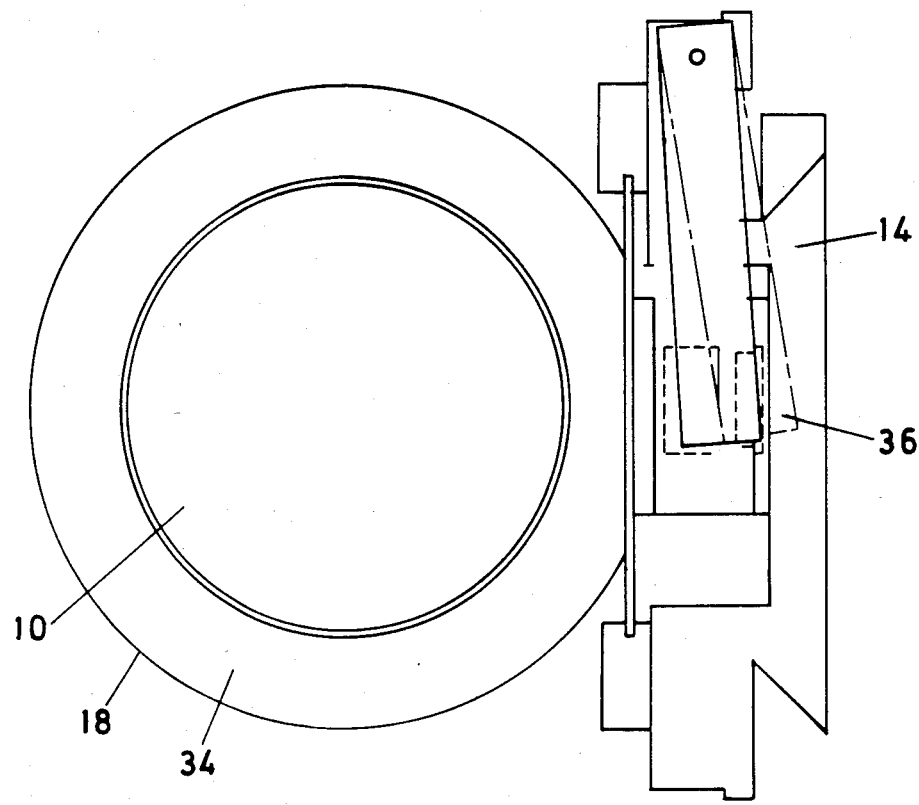
FIG. 4 is a schematic vertical plan view of FIG. 1.
Figure 5:
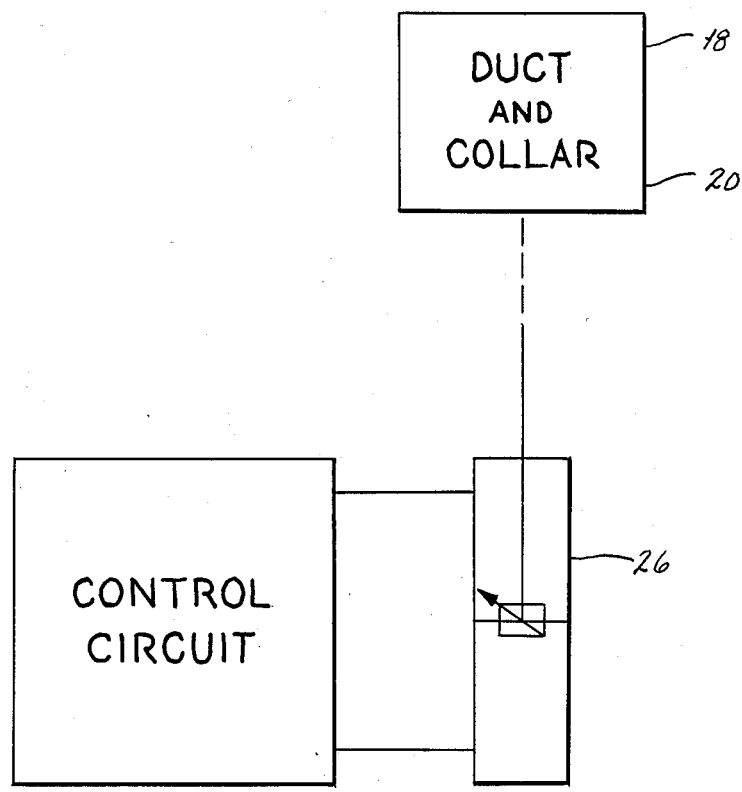
FIG. 5 is a block diagram.

The router head is mounted fast on a mounting slide 14 as seen in FIGS. 1 and 4, and the slide moves vertically in a rigid mast (not shown) of a main frame of the router, under CNC control. The control circuit of the present invention is of standard character and the constitution thereof, together with the usual valve members, is not considered to be a part of the present invention. In this manner the router head 12 can be raised and lowered relative to a worktable 16 under microprocessor control, as best illustrated by comparison of FIGS. 1 and 3.

Arranged coaxially around the electric motor 10 is a dust extraction duct 18 which supports at its lower end a dust collection collar 20. Depending from the collar 20 is an annular brush 22 the bristles of which likely engage the worktable 16 during routing as illustrated in FIG. 1.

At its top end, the dust extraction duct 18 terminates in an annular brim 24 for connection to factory dust extraction equipment (not shown).

Vertical movement of the dust extraction duct 18 and the dust collection collar 20 relative to the router head 12 is controlled by a pneumatic ram 26. A piston rod of the ram 26 engages beneath a shoulder 28 of a member which is fast to the duct 18 and collar 20, so that raising and lowering the duct and collar relative to the router head 12 is achieved simply by controlling the air supply to the ram 26 optionally under microprocessor control.

The duct 18 and collar 20 are illustrated in FIG. 1 in a lowered safety position relative to the router head 12 in which the collar 20 provides a safety guard around the router head. In this position routing can be carried out, with the brushes 22 lightly brushing against the surface of the worktable 16. The actual height of the duct 18 and collar 20 relative to the router head 12 is established by means of an adjusting screw 30, adjustable by means of a handle 32, to take account of the actual depth of cut at the router head.

Figure 2:
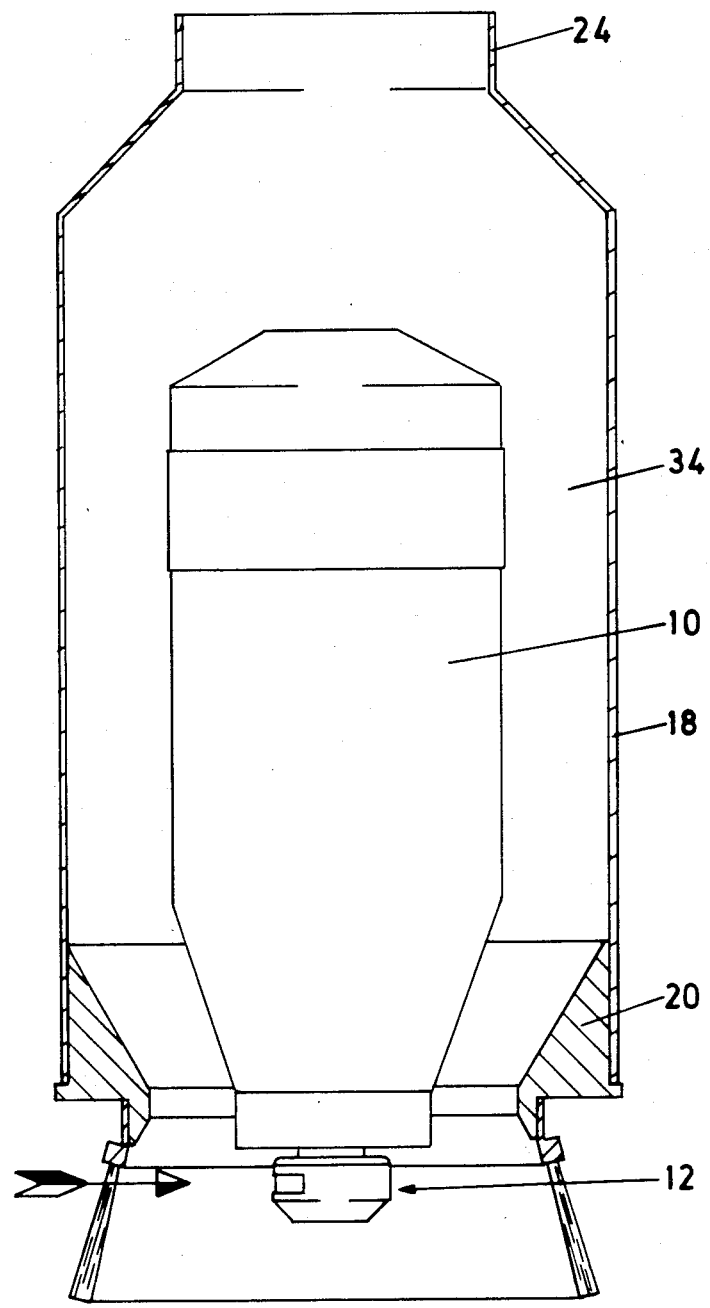
FIGS. 2 and 3 are axial sections taken transversely to that of FIG. 1 but with the collar in, respectively, its raised position for tool changing and its lowermost position for cleaning the worktable.

The adjusting screw 30 and handle 32 are carried on a pivoting arm 36 as best seen in FIG. 4, and movement of the pivotting arm to the position shown in broken lines in FIGS. 1 and 4 is sufficient to bring the adjusting screw 30 out of its line of engagement with the stop surface 28, so that continued extension of the pneumatic ram 26 will result in a further raising of the duct 18 and collar 20 relative to the router head 12, to bring them to a tool changing position as illustrated in FIG. 2 in which the brush 22, collar 20 and duct 18 have all been raised to a level high enough to facilitate tool changing.

FIG. 1 also illustrates the direction of air flow (34a) in an air passage 34 which extends completely around and axially of the electric motor 10.

The dust extraction duct and collar 18 and 20 have basically three alternative positions relative to the router head 12. In the (intermediate) lowered safety position as shown in FIG. 1 the collar 20 and brush 22 extend around the router head 12 as a safety guard. In the fully raised position of FIG. 2, rapid and unhindered tool changing is facilitated. In the extreme lowered position of FIG. 3, the router head 12 and router tool are raised well out of line with the workpiece, and the bristles of the brush 22 lightly contact the worktable. In this arrangement the worktable can be readily and rapidly cleaned by working the router head systematically over the whole of the worktable area. This cleaning may itself be under microprocessor control.

The factory dust extraction air flows in the direction of the arrows 34a through the dust extraction dust as indicated by the arrows 34a. It has been found that this air flow is remarkably efficient for cooling the electric motor 10, which is therefore illustrated as a fanless electric motor.

I claim:

1. A woodworking router having an electric motor driven router head mounted on a slide for vertical movement relative to a worktable, wherein a dust collection collar also mounted on the slide surrounds the router head and communicates with a dust extraction dust surrounding and coaxial with the electric motor for the transfer of dust and debris created during routing to factory dust extraction equipment, and means are provided for moving the dust collection collar vertically relative to the router head between a raised position in which the router head is exposed for tool changing and a lowered safety position in which the collar provides a safety guard around the router head.

2. A router according to claim 1, wherein the electric motor is a fanless motor with no cooling means other than its location in the dust extraction duct.

3. A router according to claim 1, wherein the electric motor is provided with means for braking the motor by DC injection braking.

4. A router according to claim 3, wherein the dust collection collar comprises a circular brush head supported on a guard rim of the dust extraction duct.

5. A router according to claim 4, wherein the means for moving the dust collection collar vertically relative to the slide comprises fluid-operable means interlinked with a control circuit to maintain the dust collection collar in its lowered safety position while the motor is running.

6. A router according to claim 5, wherein the fluid operable means is a pneumatic ram acting between the slide and the dust collection collar.

7. A router according to claim 6, wherein the lowered safety position of the dust collection collar is a defined height relative to the worktable, irrespective of the working height of the router head.

8. A router according to claim 7 wherein the lowered safety position of the dust collection collar is a defined height relative to the router head, irrespective of the working height of the router head.

9. A router according to claim 8, further comprising manually adjustable means for setting the defined height to suit a particular routing operation.

10. A router according to any preceding claim, wherein the means for moving the dust collection collar comprises means for moving the collar, relative to the router head, past the lowered safety position to an even lower safety and scavenge position for cleaning the worktable while the router head is out of engagement with any workpiece on the table.

* * * * *